United States Patent
Price et al.

[11] Patent Number: 6,076,036
[45] Date of Patent: Jun. 13, 2000

[54] VEHICLE CRUISE CONTROL

[76] Inventors: Christopher C. Price; Frank C. Price, both of 13812 Sand-hurst Pl., Santa Ana, Calif. 92705

[21] Appl. No.: 09/261,755

[22] Filed: Feb. 23, 1999

Related U.S. Application Data

[63] Continuation-in-part of application No. 09/166,471, Oct. 5, 1998, abandoned.
[51] Int. Cl.$^7$ .................................................. B60K 31/02
[52] U.S. Cl. ............................ 701/93; 701/104; 180/170
[58] Field of Search ................................ 701/93, 86, 104, 701/94; 180/170, 177

[56] References Cited
U.S. PATENT DOCUMENTS 4,870,584  9/1989  Etoh et al. ............................... 701/110

*Primary Examiner*—William A. Cuchlinski, Jr.
*Assistant Examiner*—Arthur Donnelly
*Attorney, Agent, or Firm*—Frank C Price

[57] ABSTRACT

An automatic control of speed for a vehicle is based on using speed setting, actual speed, acceleration and the change of the slope of the road to set fuel flow for improved fuel mileage. The proposed system of sensors and a programmed computer automatically manages fuel flow to the engine as the truck moves in gusting winds and through transitions from one slope of the road to another. As the conventional cruise control operates to maintain or change speed according to a speed setting Vs the actual speed, the added control of this invention results in a modification of the signal to fuel flow depending upon what road slope change and acceleration is detected. The result is an improvement in fuel mileage.

10 Claims, 6 Drawing Sheets

VEHICLE CRUISE CONTROL

This is a Continuation-in-Part Application for No. 09/166,471 filed Oct. 5, 1998, which is now requested to be abandoned. This CIP incorporates the two preliminary amendments to the parent application. They were filed Dec. 29 and 31, 1998. Other new material, in addition to that of the preliminary amendments, is included.

SUMMARY OF THE INVENTION

This is the invention of a cruise control adaptation for trucks to improve their delivery performance. Such performance for a truck is derived from its speed of delivery and its fuel mileage. The performance is optimized by this invention in automatically making the appropriate cruise control throttle setting changes as road slope changes. An increase in slope (going into a climb) results in a prompt fuel rate increase. With a decrease in positive slope, approaching the crest of a hill, speed stays constant, i.e., fuel decrease. With progressing negative slope requires there is fuel decrease even below set speed. Throttle settings arranged simply for maximum fuel mileage can sacrifice speed too much for good delivery performance.

The economic factors of speed and fuel mileage come into play especially in a large part of the U.S. where trucks encounter roads with consistently undulating hills. For hill climbing this invention operates under cruise control to maintain speed at the transition from level control to climbing. It also saves fuel (1) in downhill travel (2) in travel with variable winds (3) in slope changes from climbing to descending (4) in various road slope changes during a climb (5) in the changing from climbing to level transit, and (6) in acceleration from stop or slow speed to cruise speed.

The optimum truck speed for best fuel mileage in hill climbing can be too slow for best overall motor freight economics because a trip shortened in time by speed obviously has economic advantages. If fuel consumption were the only consideration in truck speed, trucks would travel at forty miles per hour and would climb hills in the fashion of the Japanese patent 8-295154.

This invention addresses both economic factors, speed and fuel consumption. In this regard it works better than the conventional speed control which has no fuel conserving features involving road slope changes and the Japanese approach which operates during uphill travel only for fuel conservation.

There are at least three distinctly different types of cruise control for vehicles including this invention. First, the most common (state-of-the-art or "SOA") is in use with many vehicles of the road. The SOA cruise control adjusts the engine power to hold a set speed as the vehicle goes through various road slopes. It makes no attempt to anticipate a hill climb; in fact, it has a delay in responding to the increased fuel demand of a hill. Another cruise control is described in Japanese patent 9-295154. It reduces the speed to allow a vehicle to climb a given hill with minimum use of fuel. The hill climb can be quite slow at the speed of best fuel economy. The third type, this invention, operates to hold speed as a hill is begun. It does not interfere with the driver's goal of speedy delivery, while it provides a degree of fuel conservation. It does this in the transition of slope as a hill is entered. Also, the system of the invention operates differently from that of the Japanese in downhill travel. The present system allows a degree of speed droop in descending by keeping the fuel flow stopped if the hill is steep enough. The Japanese concept operates to maintain the set speed or a higher speed using automatic braking The controller of Japanese patent 8-295154 uses measurement of road slope ahead to define the hill being climbed by the truck. The following aspects of the Japanese patent are different from our concept: (1) a goal of minimum fuel usage in the climb of a hill and (2) the use of the truck power train operating characteristics in combination with the road slope to determine the speed of climb on the hill and (3) measurement of the road slope ahead of the truck. It does not respond to the positive transition of slope at the beginning of a hill in the manner of our invention. In fact, the Japanese concept reduces speed as soon as it detects an increased slope ahead. Immediately, it changes the speed toward a lower value to be held during the climb.

The technique of this invention for hill climbing begins at the very start of the hill. Slope is measured at the truck, not ahead. Power is advanced the moment the slope increases. The SOA cruise control systems normally have a built in lag of about 200 engine revolutions. This is too long for a good start on a hill. Consequently, there tends to be a speed droop as the truck goes into a climb. Actually, a surge in power is the better procedure as the hill is entered. The present invention supplies that. If the climb gets steeper, the control will respond sooner than that of an SOA control in calling for more fuel flow. As the crest of the hill is approached with declining slope, the climb having been steep enough that set speed could not be held, the present control will hold off speed increase through the crest of the hill and on until the slope stops decreasing when set speed will be resumed.

If a downhill is steep enough to allow adequate speed with fuel flow off, this allows fuel conservation. With an SOA cruise control, as a truck proceeds downhill on a slope where set speed cannot be reached without fuel, the controller will call for fuel. This invention allows a pre-determined speed droop of 5 mph, for example, before fuel is called for. This opens up opportunities for fuel to be saved without a great sacrifice in speed.

This invention can be set to preclude a fuel flow change when the slope data indicates no slope change, yet a speed change occurs, i.e., the change in speed is caused by a wind speed change. At the same time, the controller is quick to respond to a slope change in synchronization with whatever the changing road slope is. Any tendency for the controller to call for excessive power when an increase in slope is detected, can be avoided by the programming of the reaction to the slope change.

The present invention uses computer-type programming to allow fuel flow, under a given target speed, to be changed with the changing of road slopes in Hilly Country. An optimum balance between fuel economy and good speed is programmed. A cruise control designed for maximum fuel mileage, only, on a hill climb, such as the Japanese patent, would not result in optimum economics for the motor freight mission.

The slope measured by a dangleometer or other type of sensor of road slope can be adjusted by acceleration data input for the effect of acceleration on the perceived slope. The acceleration sensor could be of the inertial type or the signal could be derived from the monitoring portion of an automatic braking system or it could be derived from the part of an SOA controller which monitors speed and its changes.

There is a maximum RPM for each engine above which fuel mileage becomes especially degraded. Therefore, among the features of control under this invention to be programmed, a limit on engine RPM can be included, especially in acceleration to cruise speed.

DETAILED DESCRIPTION

Figure 1:
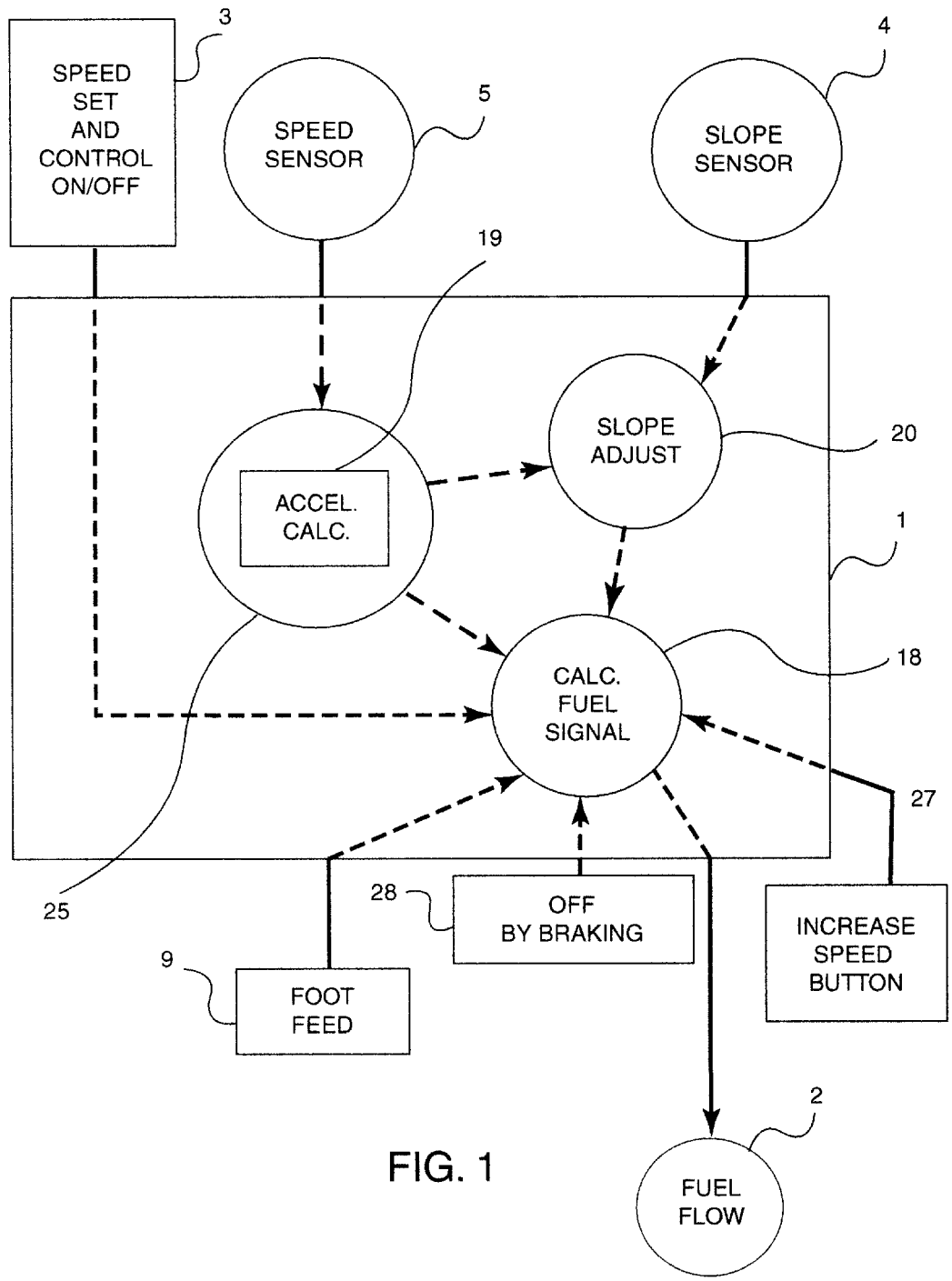
FIG. 1 is a diagram of a system in which the conventional cruise control signal for fuel flow is modified by a measurement of road slope change after it is adjusted for acceleration's effect on slope measurement.

In FIG. 1 automatic cruise control 1 is turned on at 3 and instant speed becomes the speed setting. There is a conventional "increase speed" button 27. A conventional cruise control computer 25 develops a signal for fuel flow rate 2. This is one of many possible arrangements for using slope measurement and its change 4 to adjust the cruise control signal 18 to the fuel flow 2. The slope sensor, itself 4, or the software processing its signal within 20 would be dampened to discount jiggling due to bumps in the road. Acceleration, computed at 25 from the rate of change of speed, is imposed at 20 on the slope to adjust for the effect of acceleration on perceived slope. Both the slope change from 20 and the fuel setting from 25 combine at 18 to determine the fuel signal that is then transmitted to the fuel flow controller 2. As in SOA controls, there is a foot feed 9 always available to the driver to control fuel feed over the computer control. Acceleration measurement is a part of most speed controllers because the controller looks at rate of approach (rate of speed change) to the set speed in developing its fuel flow signal. This controller has the conventional "increase speed" button 27 and the "controller off" 28 activated by the brake pedal.

Slope change alone in this invention can control a change in fuel flow. However, the relationship of slope to fuel flow requirement is complicated by concomitant changes in rolling friction and wind friction. Nevertheless, the embodiment of FIG. 1 would utilize only slope as a new input to cruise control.

Figure 2:
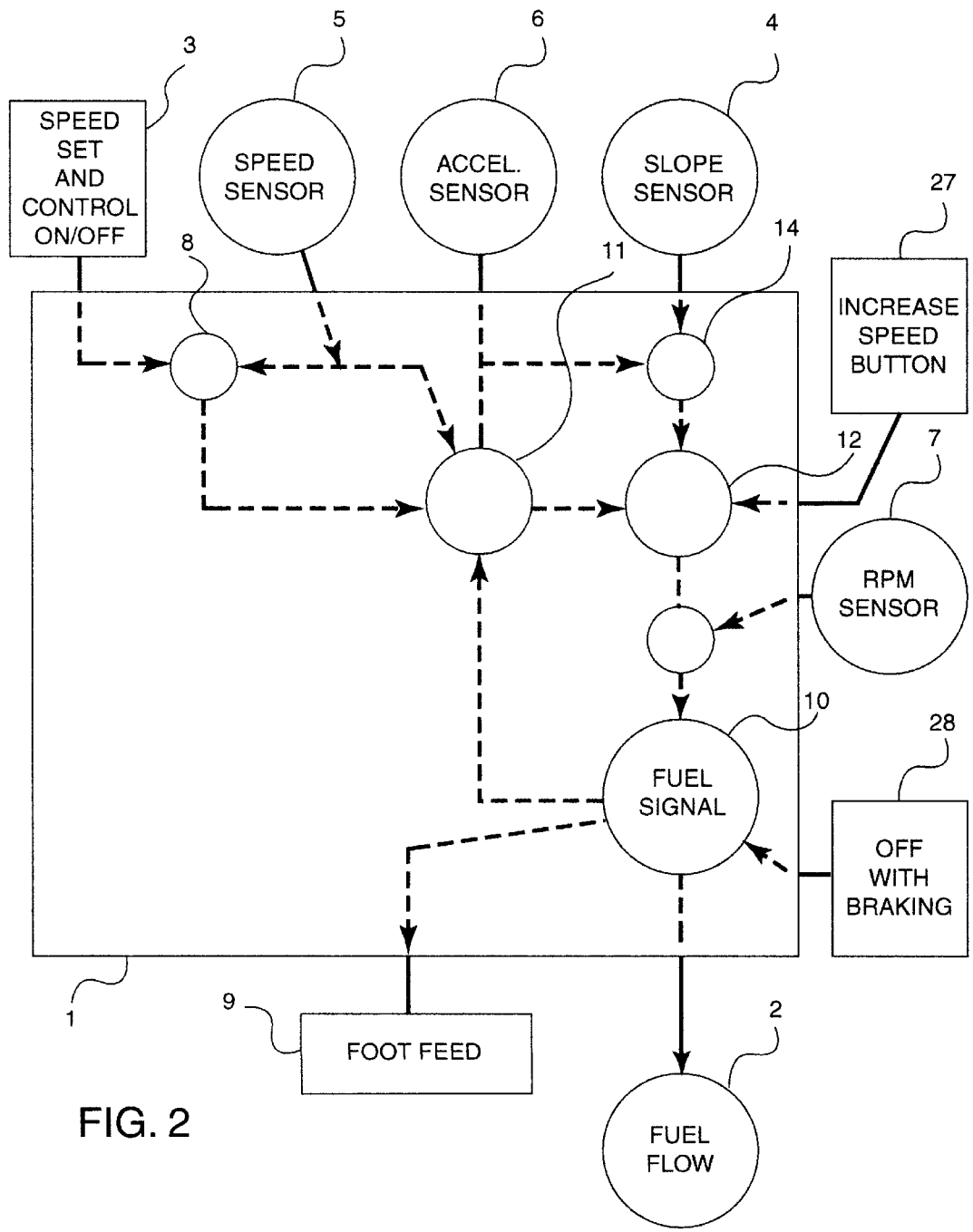
FIG. 2 is a diagram of a system much like that of FIG. 1, except with a different arrangement of the data input and with engine RPM an added input. Also, acceleration, itself, is used as a factor in the control's establishment of fuel flow rate. Actually, acceleration is directly or indirectly accounted for in every case.

In FIG. 2 another version of the control is shown in which RPM 7 can have an effect on the fuel flow signal. Acceleration also is used in the fuel flow calculation of the controller. In the diagram, acceleration 6 is shown apart from the speed set/speed sensing 8 comparison of the computer because it is a separate acceleration sensor such as a liner accelerometer mounted on the frame of the truck. The computer 1 uses the measurement of speed 5 and the speed setting 3 to develop a signal of fuel demand at 8. It then modifies that signal at 11 based on the measurement of acceleration 6. Again, the fuel flow signal is modified at 12 based on the measurement of changing slope 14. The primary measurement of changing slope 4 is corrected at 14 for the effect of acceleration on the slope measurement. The RPM sensor 7 is programmed to reduce the fuel signal developed at 12 if a pre-set RPM limit is otherwise exceeded. Finally at 10 a signal is sent to the fuel feed regulator 2. Driver override by foot feed 9 can determine fuel flow. Slope change is the major element affecting a change in fuel rate by the controller, although speed differential, actual Vs setting, is always a factor, too. The controller also has an "increase speed" button 27 and an "off" signal 28 with the brake pedal. The fuel signal from 10 also goes back to 11 in order that acceleration due to fuel flow change can be accounted for.

Figure 3:
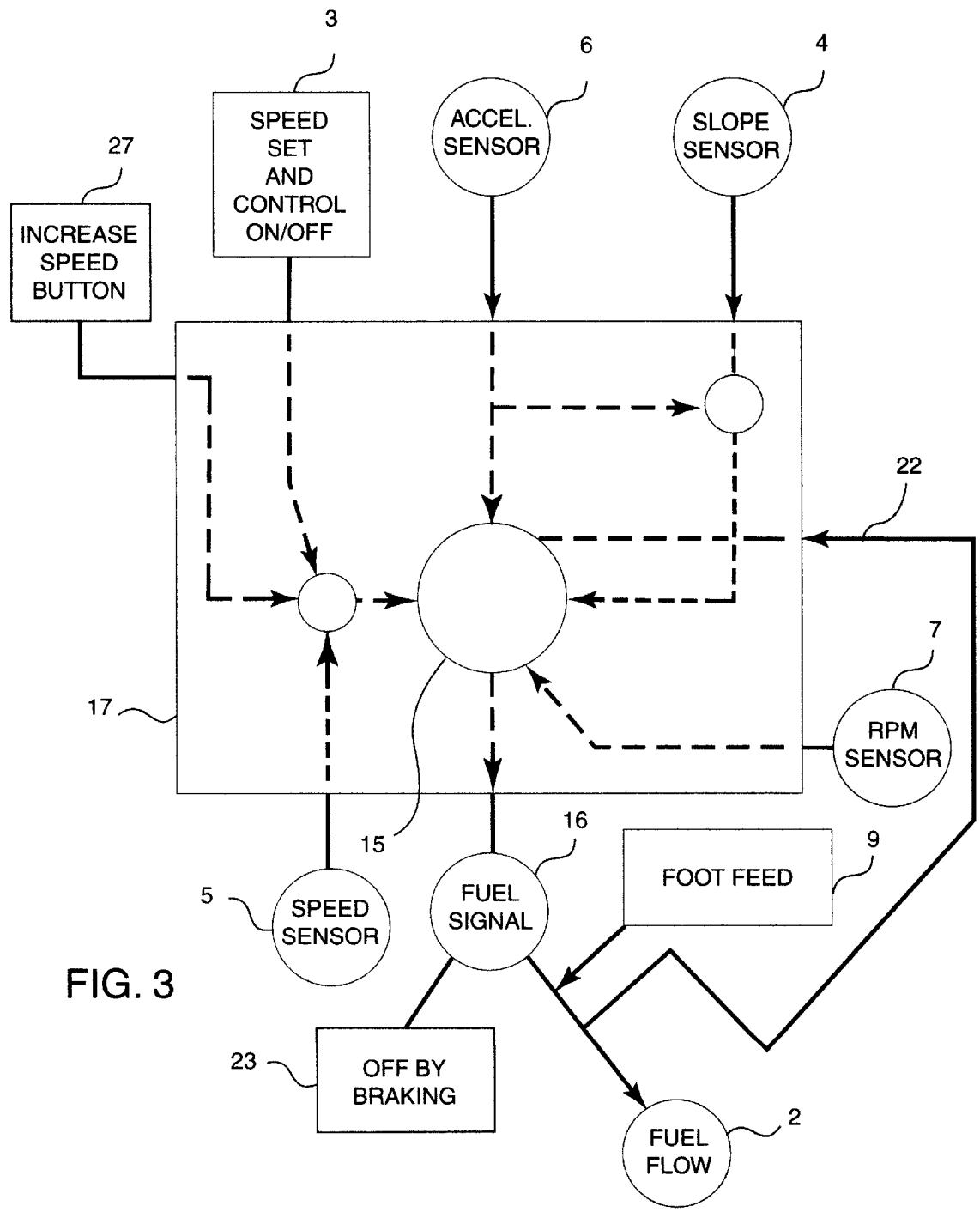
FIG. 3 is a diagram of a system in which the conventional cruise control signal for fuel flow is modified in one central computation involving acceleration, slope and engine RPM.

In FIG. 3 the speed setting 3 is modified by the computer 17 based on acceleration and changing slope measurements. The modified signal from the processor 15 is combined with speed 5 to develop at 16 the signal for fuel flow. The speed 5 and signal from processor 15 combine much like in a conventional cruise control. The acceleration that is beyond what the instant fuel flow is causing could be caused by wind. Therefore, fuel flow rate is fed back 22 to the computer's calculations which use the acceleration measurement. The acceleration measurement 6 can be separate from the controllers 17 or it can come from the computer's reading of change in speed. In this diagram it is shown as a separate measurement.

Figure 4:
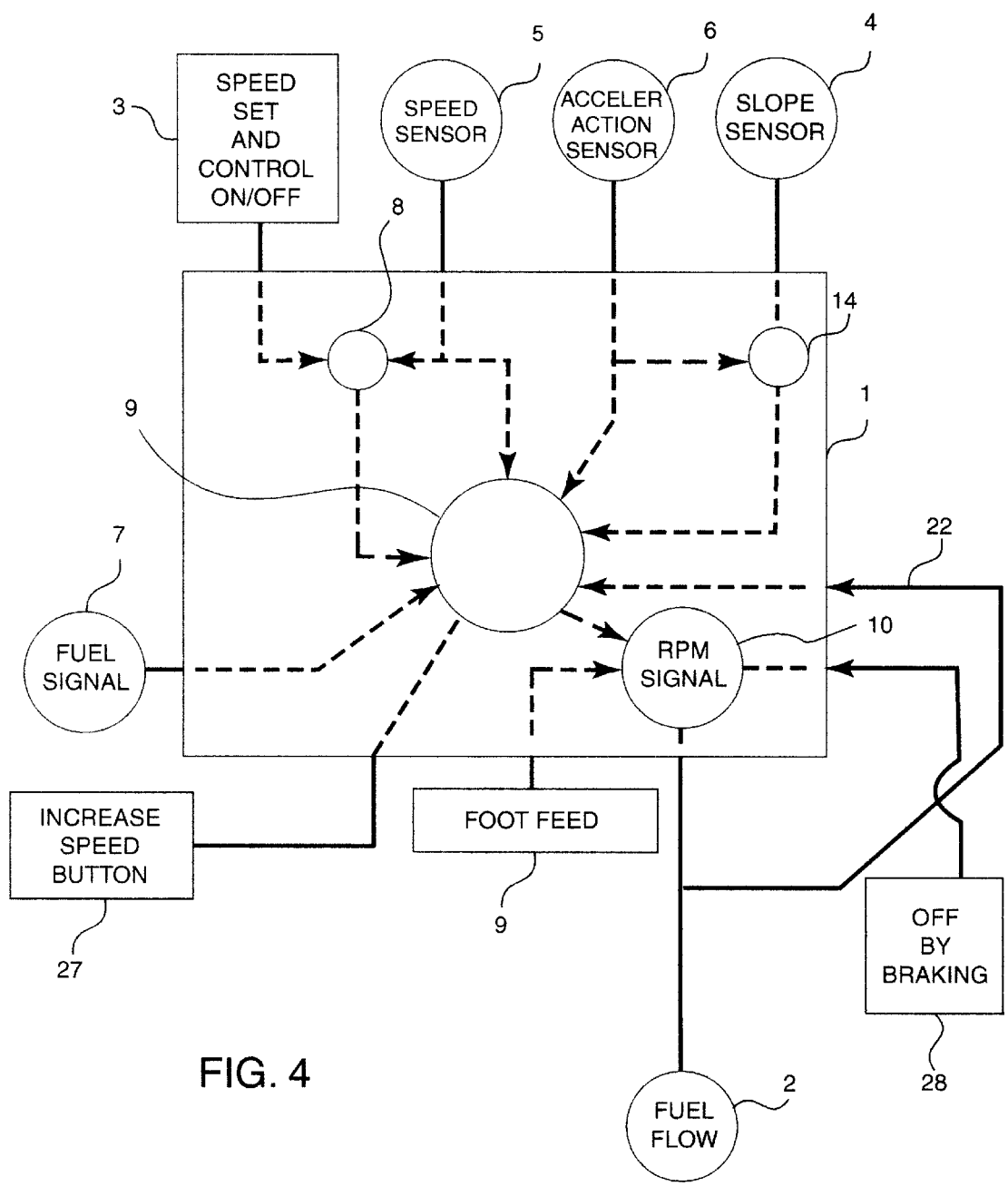
FIG. 4 is a diagram of a system with even more of a centralized computer unit that processes inputs to adjust the SOA fuel signal.

In FIG. 4 the modification of the cruise control signal 8 takes place in one central processor 9 within the computer 1. At 9 is generated the fuel signal 10, based upon the measurements of acceleration 6, slope 4, speed 5, RPM 7 and fuel flow signal 22.

Figure 5:
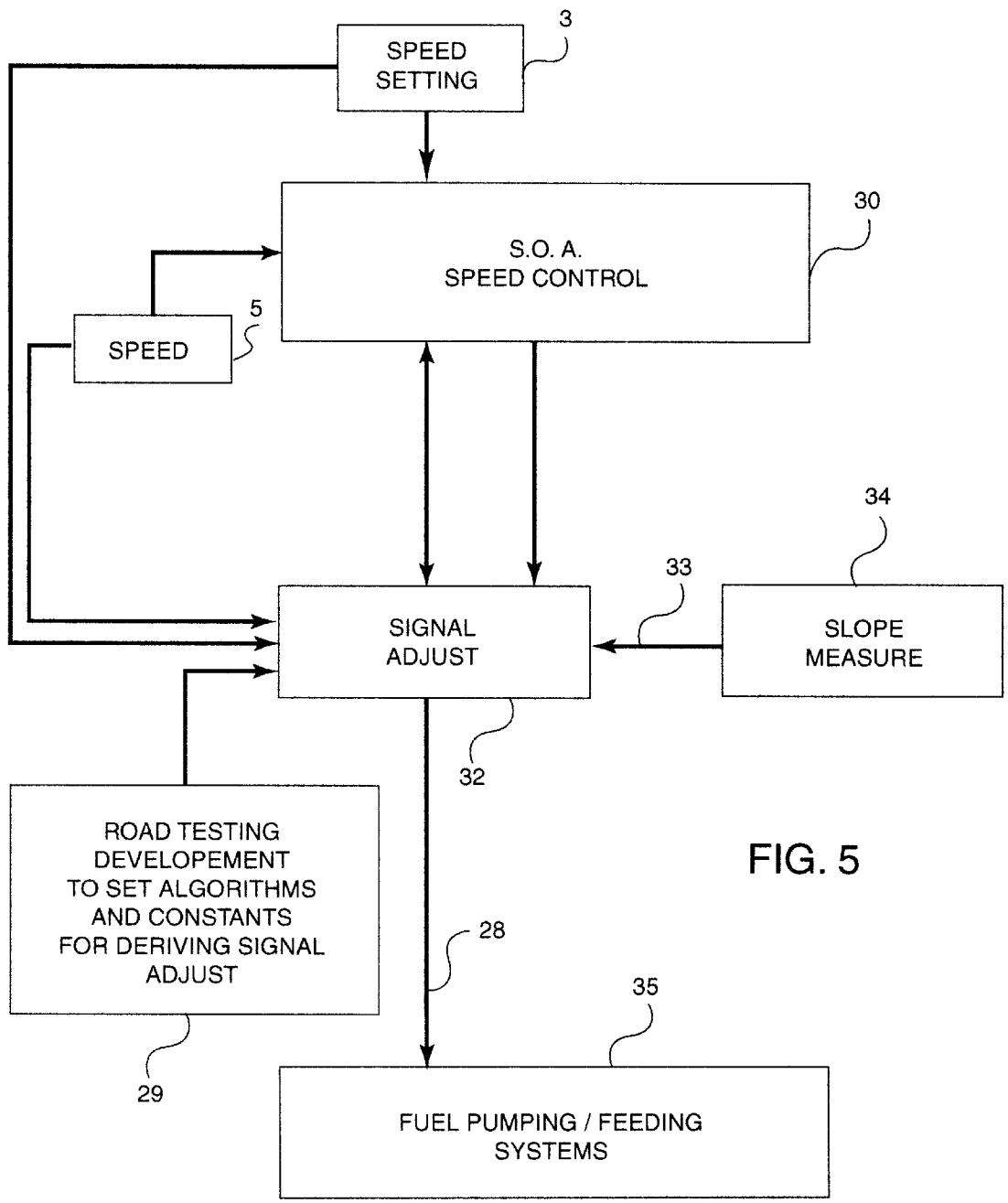
FIG. 5 is a diagram illustrating the case of having the slope measurement alter the fuel flow signal from an SOA cruise control unit.

FIG. 5 shows an SOA cruise controller 30; a slope change signal 33 leading from a measurement of slope change 34; the signal adjust 32 where speed setting 3, speed data 5, and fuel signal 31 from the SOA controller 30 are used to create an adjusted fuel rate signal 28 which leads to the fuel pumping system 35. The signal adjust 32 is programmed based on road testing development to optimize its performance. Through road testing the algorithms and constants used in programming are derived to produce fuel saving results and to provide against excessive fuel rate changes as the slope changes. This makes signal adjust 32 operate like an expert driver who gets superior fuel mileage.

Figure 6:
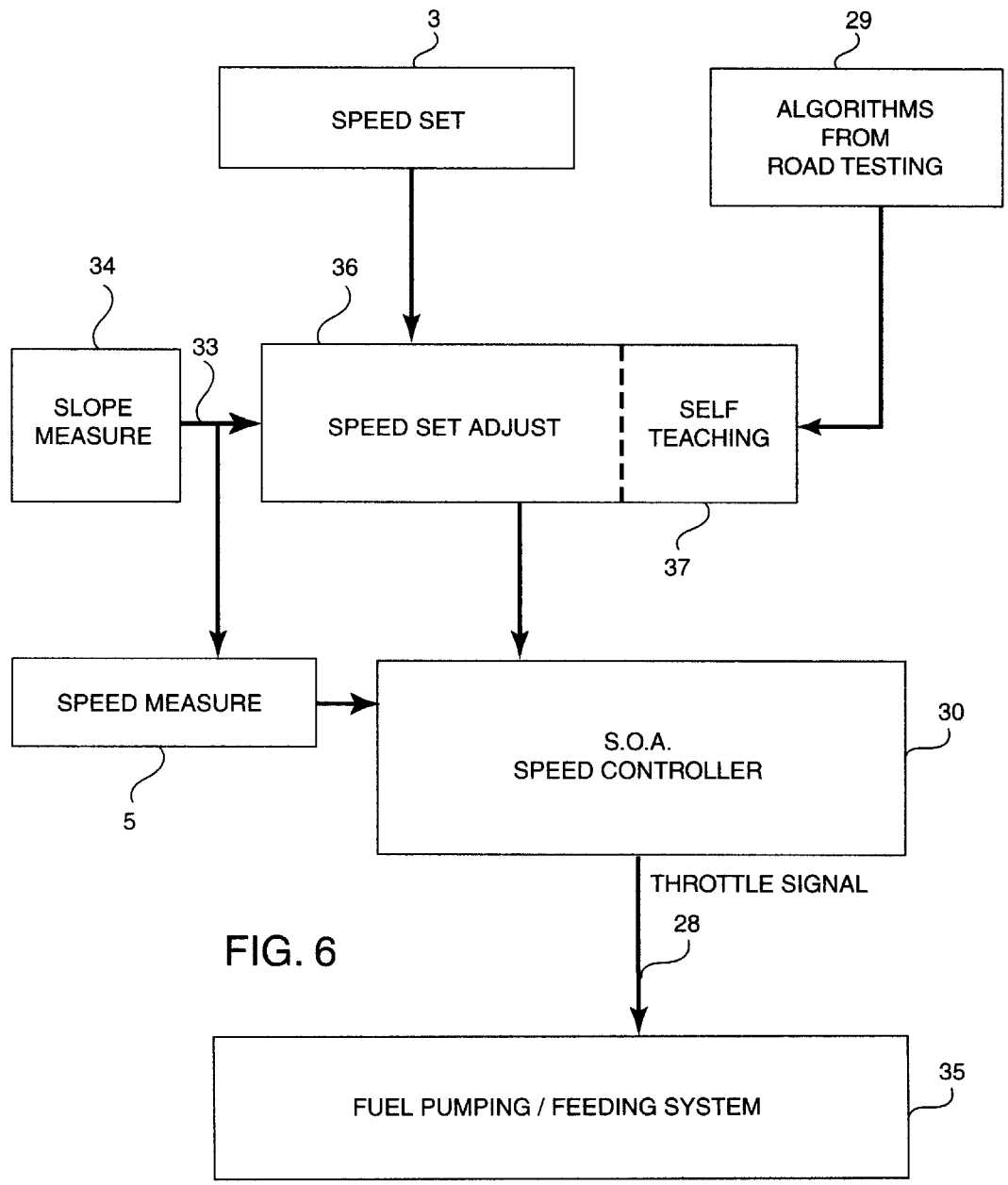
FIG. 6 is a diagram illustrating the most straightforward case of having the slope measurement alter the set speed on an SOA cruise control unit.

FIG. 6 shows an SOA cruise controller 30; a changing slope measurement signal 33, leading from a slope measurer 34, and the speed set 3 leading to the speed set adjust 36 where the normal speed set 3 for the cruise controller 30 is adjusted for the effect of slope change. The rationale 29 of speed set adjust is based upon algorithms founded with road testing and evolved with self-teaching 37 to result in an optimum set speed adjust rationale. The SOA controller 30 then develops its throttle signal 28 to the fuel pumping system 35.

An SOA computer, with the necessary added hardware for additional programming, can be programmed by those expert in the art to process the input data of this invention to modify the SOA cruise control signal. Testing for a given engine with an actual truck could be used to establish the best algorithms and constants for the programmed relationships and derived signals. Also, by state-of art programming the controller might be designed to teach itself the best way to control fuel flow for best economy in the combination of speed and fuel mileage. This self teaching could be developed under actual truck travel during which the techniques of override of the cruise control for improved fuel mileage would be carried out by the driver and imposed on the programming of this invention.

Once the computer programming approach is taken to modify the workings of an SOA cruise control by adapting it to incorporate slope change and acceleration, an unlimited number of computer and computer programming means can be developed for this invention by those skilled in the art of computer control. The diagrams presented in the figures are only samples of what might be done. After choosing a computer design and programming it for the functions of this patent, the programmer would take into account the practical needs for changes in fuel flow under actual operating conditions. Examples of these are as follows:

(1) As a climbing truck approaches the crest of a hill and the positive slope of the road starts to taper off, good fuel economy requires that the fuel flow be reduced more than a conventional speed control would do. The hill is best finished at the climbing speed achieved before slope reduction. Changing slope combined with changing acceleration allows the computer to anticipate leveling off of the road or change to a negative slope better than would an SOA speed control. By measuring the acceleration of speeding up and at the same time detecting decreasing slope, the control of this invention can effect more efficient climbing as it calls for a lower fuel flow.

(2) When a truck is moving down a steep enough grade that the speed setting is almost reached without the use of fuel, addition of fuel at a low flow rate is an inefficient use of fuel. This would commonly happen with SOA speed controls. For good fuel economy it would be better to use no fuel and proceed down the hill at slightly less than the desired speed. This can be accomplished by the invented system. For example, in FIG. 1, if the computer 1 sees a signal 20 of an appreciable negative slope and a speed 5 no lower than, say, 5% below the set speed 3, the computer 1 shuts off fuel for the sake of better fuel mileage. If the computer sees a signal of a speed 5 of no more than, say, 5% above the set speed 3 and a positive slope 14, for better fuel mileage the computer 1 would set at 18 a fuel rate 2 higher than that set if the slope signal 20 indicated level ground. Such a setting would be especially helpful if slope were to be steadily increasing.

(3) Without having a measurement of the wind, the computer will "see" the wind effect as a changed speed in the absence of a change in fuel flow or slope. An SOA cruise control tends to surge engine power as variable winds cycle the truck speed up and down. This results in reduced fuel mileage compared to steady fuel flow. Under wind surges, changes in fuel rate can be delayed by this invention such that the range of variable fuel rates under surging winds is minimized.

(4) Fuel economy can be helped if the tuck is held to accelerate, even if the truck is lightly loaded, as if the truck were heavily loaded. The computer can be programmed to achieve this by limiting fuel flow to hold acceleration within a given range. With startup on an uphill or downhill path the best acceleration can be programmed via fuel flow rate taking slope into consideration.

(5) It is best to try to maintain momentum going into a hill. If the truck were to receive a gust of tail wind just as a hill climb were started, an SOA cruise control would reduce fuel flow in reaction to the ensuing speed increase, while the present invention would not because it would sense the positive slope as well as the speed increase.

Table I summarizes the control measures of this invention which override the SOA cruise control.

TABLE I

| Road Condition | Programmed Action |
|---|---|
| Perceived slope increase | An increase in fuel flow is imposed on the cruise control in some proportion to the slope increase. |
| Perceived slope decrease | Velocity is held constant |
| Negative slope and speed no less than a specified fraction of set speed | Fuel cutoff |
| Speed change with no slope change | Fuel flow constant for a pre-set interval |
| Acceleration from speed under a pre-set velocity | Fuel flow restriction |

The relationship between slope and the best fuel flow signal at any one time can be developed with a truck equipped with a recorder of slope, speed, acceleration and fuel flow setting. The truck is then driven in a manner for improved fuel mileage as well as at expeditious speed and with override of the cruise control at the points in travel singled out by this invention for fuel mileage improvement. Once the recording has been made under every possible road slope condition and even with both a light load and with a heavy load, the data are then processed into "look-up" tables for a computer program to be used in computerized cruise control involving slope. The same approach can be used to develop a program in which truck acceleration or deceleration is used as well as slope. As to the programming which provides steady speed for cruise control under conditions of gusting winds, recordings of speed changes under such winds could help establish criteria for appropriate dampening of the fuel flow setting, or a cut-and-try approach could be used by programming logically the dampening and then testing on the road for effectiveness—then making changes for perfection of the approach. The program for fuel shut-off during descent where adequate speed would still be maintained could be, again, programmed using simple calculations and then be adjusted after testing on the road.

The present embodiments are to be considered in all respects as illustrations and not restrictive and all changes coming within the meaning and equivalency range are intended to be embraced herein. The depictions in the figures are not intended to limit the invention to the indicated steps in computer handling of the prescribed input data to manage fuel flow rate in maintaining or approaching a set speed. Any number of computer hardware sets and any number of computer programming methods can be used to implement the concept. The goal of incorporating slope change and acceleration into the control would be to establish the possible fuel mileage gains over operation under SOA cruise control alone.

We claim:

1. An automatic controller of the velocity of a vehicle, said vehicle operating on a road, said vehicle having a propulsion system, said vehicle powered by fuel, said fuel flowing under control of a flow regulator, said automatic controller having a manually set target velocity, the improvement comprising:

A means of sensing the slope of said road, means for developing a signal based upon said slope measurement; programmed computer means for adjusting, through said signal, said fuel flow, said adjustment resulting in augmenting said propulsion with positive slope change, said augmenting being beyond that called for by said set target velocity, said augmenting providing enhanced fuel mileage.

2. The automatic controller of claim 1 wherein said fuel flow adjustment is made through an automatic change in said target velocity setting.

3. The automatic controller of claim 1 wherein said fuel flow adjustment is made through said fuel flow rate controller.

4. The automatic controller of claim 1 with said vehicle climbing at a given velocity, wherein said adjusting results in a holding of said velocity as a decrease in slope occurs.

5. The automatic controller of claim 1 wherein said adjusting amounts to be stopping of fuel flow with negative slope sensed and velocity equal to no less than a pre-set percentage of said set speed.

6. The automatic controller of claim 1 wherein said computer programmed means delays change in said fuel flow when velocity changes simultaneously with no change in road slope.

7. The automatic controller of claim 1 with programmed means for limiting vehicle acceleration to a pre-set maximum.

8. The controller of claim 1 in which the adjusting of said fuel flow by said programmed computer amounts to changing the throttle setting determined by the automatic controller of velocity and resulting in a different speed than set speed.

9. An automatic speed control for a vehicle, said vehicle having a throttle, said control having a manual target speed setting, said vehicle developing speed and a resultant fuel mileage; a means for automatically adjusting said throttle to a first position to enable said vehicle to approach and hold said target speed, said vehicle traveling roads of various slopes and in winds of various speeds and directions, the improvement comprising:

A means for measuring said road slope, a means for using said road slope to automatically adjust said throttle to a second position, said second position resulting in an off-target speed and in improved fuel mileage.

10. The control of claim 9 in which said winds change said vehicle speed, said second throttle position being one of unchanged throttle position.

* * * * *